United States Patent [19]

Favre

[11] Patent Number: 5,169,280
[45] Date of Patent: Dec. 8, 1992

[54] POLYVALENT DEVICE FOR THE RAPID LIFTING OF SHEETS OF GLASS

[75] Inventor: Serge Favre, Tartas, France

[73] Assignee: Societe Generale pour les Techniques Nouvelle, Saint Quentin en Yvelines, France

[21] Appl. No.: 688,532

[22] PCT Filed: Oct. 20, 1989

[86] PCT No.: PCT/FR89/00549
§ 371 Date: Jun. 11, 1991
§ 102(e) Date: Jun. 11, 1991

[87] PCT Pub. No.: WO91/05722
PCT Pub. Date: May 2, 1991

[51] Int. Cl.$^5$ ................................................ B66C 1/00
[52] U.S. Cl. .................................. 414/737; 414/728; 414/731; 414/738; 414/783; 414/798.5
[58] Field of Search ............... 414/728, 731, 732, 737, 414/738, 742, 743, 763, 773, 783, 798.5; 198/409, 468.3, 468.4

[56] References Cited

U.S. PATENT DOCUMENTS

| | | | |
|---|---|---|---|
| 3,902,606 | 9/1975 | Ronbeck | 414/737 X |
| 4,444,537 | 4/1984 | Werner | 414/737 X |
| 4,846,625 | 7/1989 | Gabillet | 414/737 |
| 5,030,059 | 7/1991 | Favre | 414/783 X |

FOREIGN PATENT DOCUMENTS 0162649 6/1989 Japan .................................. 414/737

Primary Examiner—Joseph E. Valenza
Assistant Examiner—Tuan N. Nguyen
Attorney, Agent, or Firm—Bucknam and Archer

[57] ABSTRACT

A device for lifting sheets of glass brought on a conveyor, has at least one arm rotatable about a horizontal spindle, situated at the lower end of the arm, between a substantially vertical position for gripping the sheets on the conveyor and a substantially horizontal position for depositing the sheets. The device also has a support mounted on the upper end of each rotating arm, the support being slidable along the axis of the arm. The support carries first suction cups for gripping the sheets and at least two retractable arms fastened with the support, the arms being rotatable between a substantially horizontal axis carried by the support, each retractable arm being provided with second suction cups. The retractable arms and the second suction cups are disposed symmetrically with respect to the conveyor axis and in such a way that the sheets of large dimensions are gripped while being in equilibrium.

4 Claims, 2 Drawing Sheets

POLYVALENT DEVICE FOR THE RAPID LIFTING OF SHEETS OF GLASS

The invention relates to a device for the rapid lifting of sheets of glass, said device being adaptable to sheets of varied dimensions (polyvalency).

The sheets of glass are gripped in a substantially horizontal position, for example on a conveyor, and placed in substantially vertical position, for example stacked on a table. Such operation being called lifting.

The current lifting machines are designed for specific dimensions of sheets.

For example, there are lifting machines for sheets of small dimensions (length=600 to 1200 mm, width=400 to 600 mm), working at very rapid rates (one sheet being lifted every 2 secs.) or at more generally rapid rates (3-4 secs).

There are also on the market machines that are designed for sheets of average dimensions (length=1,000 to 1,300 mm, width=1,800 to 3,500 mm) working at slower rates (over 6 secs).

European Patent Application 0 243 236 illustrates a machine for lifting sheets of small dimensions. It comprises arms mounted perpendicularly to a shaft driving them in rotation, gripping means (suction cups) mounted on the end of each arm, said arms being slidable perpendicularly to said shaft.

To enable financial and installation space savings, the present invention proposes a simple and compact lifting machine, capable of picking up sheets of variable dimensions, and of working at rapid rates (one sheet being lifted every 4 secs. or more).

More precisely, the device for lifting sheets of glass brought on a horizontal conveyor, according to the invention, comprises:

at least one arm rotatable about a horizontal axis situated at the lower end of said arm, between a substantially vertical position for gripping the sheet and a substantially horizontal position for depositing it, said device further comprising means for rotating the arm, a support mounted on the upper end of each rotating arm, which support is slidable along the axis of said arm and carries suction cups for gripping the sheets; the rotating arm or arms, support or supports and suction cups being disposed symmetrically with respect to the conveyor axis, their number and position being determined as a function of the dimensions of the sheets to be lifted, at least two retractable arms fast with the support or supports, which arms are rotatable between a substantially horizontal working position and a substantially vertical rest position about a horizontal axis carried by said support or supports, each arm being provided with suction cups, said arms and suction cups being disposed symmetrically with respect to the conveyor axis and in such a way that the sheets of large dimensions are gripped while being in equilibrium, means for synchronously actuating and controlling said retractable arms, support or supports and suction cups.

The invention will be more readily understood from the figures.

Figure 1:
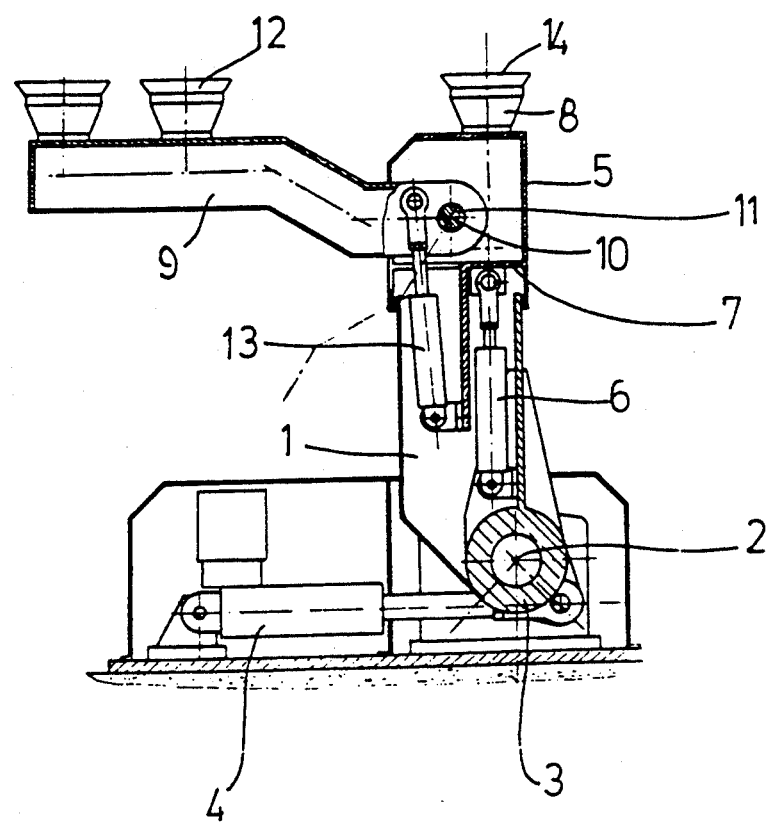
FIG. 1 is a lateral view of the device.

As illustrated in FIG. 1, the device according to the invention comprises at least one arm (1) rotating about the spindle (2) of a horizontal shaft (3) placed at the lower end of said arm (1).

FIG. 1 only shows one arm, but others may be provided on the same rotation axis and which are not diagrammatically illustrated in cross-section.

Rotation is obtained for example by means of a jack (4) operating the spindle (2) of the shaft (3). Other means may also be suitably used for actuating the arm.

The arm or arms move between a substantially vertical position, corresponding to the action of gripping the sheets, and a substantially horizontal position corresponding to the action of depositing the sheets.

At the other end (upper end) of each arm, is provided a support (5) slidable along said arm (1).

Sliding is obtained for example by means of a jack (6) advantageously placed inside said arm (1), thus saving space on the machine.

As illustrated in FIG. 1, the jack (6) is fast with a bearing surface (7) of the support (5) to allow raising or lowering of said support or supports (5) along the arm. Means are of course provided for operating the jack (6).

The upper end of each support comprises suction cups (8) or other means for gripping the sheets of glass. Said suction cups or means may be mounted directly on the support or on fingers fixed on the support.

Means for removing the air from the suction cups or for returning the air therein are provided and, in general, means for actuating said gripping means.

The device further comprises according to the invention at least two retractable arms.

FIG. 1 shows one retractable arm (9) which fastens with the support (5). Said arm is rotatable about the horizontal axis (10) of the shaft (11) mounted in the support (5). It is provided with suction cups (12) or other means for gripping the sheets.

It can be moved from a horizontal working position to a vertical rest position. The horizontal position corresponds to the action of gripping the sheets of larger dimensions.

The retracted position corresponds to the action of gripping sheets of small dimensions where only the rotating arm or arms (1) are used. Therefore the suction cups (12) of the retractable arms are not involved, only suction cups (8) are working in this case.

Rotation of the retractable arms is caused for example by a jack (13) positioned inside the corresponding assembly constituted of the rotating arm or arms (1) and support or supports (5).

Retractable arms (9) must be two in number in order for the sheet to be lifted in equilibrium.

To that effect also, they are placed symmetrically with respect to the conveyor 20 axis. It is noted that the sheet 22 reaching the gripping station had been focussed onto the conveyor and that it is in a predetermined and known position making it easier to lift it.

The number of suction cups (12) and their disposition on the retractable arms are likewise selected so that large sheets can be lifted in equilibrium. Such number and disposition are not determined independently of the number and position of suction cups (8): they are such that each suction cup supports substantially the same surface of glass.

Quite obviously, the disposition of the retractable arms, their geometry and the disposition of the suction cups are also determined so that the edges of the sheet are supported and the arms can be retracted.

Figure 2:
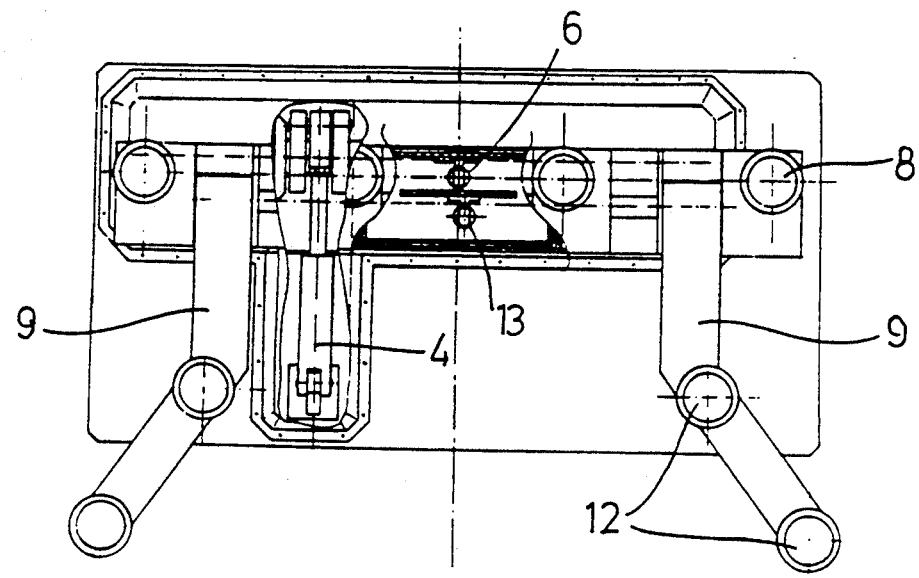
FIG. 2 is a plan view of one advantageous embodiment of the device according to the invention.

FIG. 2 shows a plan view of a device according to the invention with only one arm (1), not clearly visible on the figure, with only one support (5) covering nearly the whole width of the conveyor is (dimension perpendicular to the conveyor axis, the dimension along the axis being the length).

The arm is actuated by the jack (4). Jacks (6) and (13) are shown inside the arm for actuating the support and the shaft supporting the retractable arms (9).

FIG. 2 shows two arms (9) symmetrically retractable with respect to the conveyor axis, which is also the axis of the single rotating arm. Each arm supports suction cups (12).

The suction cups and retractable arms are disposed in such a way that the large sheet which is gripped is in equilibrium.

The arms (9) are preferably bent to help their retraction in substantially vertical position.

The operation of such a device for gripping a large sheet is easily explained.

To simplify the explanation, the embodiment comprising only one rotating arm, two retractable arms and control jacks has been chosen here, but any other embodiments will work in the same way.

A plate is brought on the conveyor to the gripping station.

The rotating arm (1) is vertical so that the active surface of the suction cups is parallel to the sheet. The retractable arms are brought to the horizontal position or work position, in parallel to the sheet, by means of jack (13).

The support (5) is lifted by the jack (6) so that the suction cups (8) and (12) in suction condition are in contact with the sheet.

The rotating arm is brought in substantially horizontal position for depositing the sheet on a table or other means. The suction cups are released, and air can even be insufflated into them to help depositing the sheet.

The support (5) is lowered by the jack while the arms (9) are retracted to allow the lifting device to pass under the next sheet already in position at the gripping station.

According to a more advantageous working method, once the sheet has been gripped, the support (5) is lowered as the rotating arm starts moving. The support (5) is brought forward again for depositing the sheet on the table or on a mean center. Then the sheet is "thrown" onto the table when air is simultaneously blown by the suction cups.

All these operations are controlled automatically by appropriate means ensuring synchronization of said operations.

For gripping a small sheet, the arms (9) are retracted, only the rotating arm or arms (1) and the suction cups (8) are actuated.

With rapid rates, as this is the case with this particular machine, shock effects occur in spite of the fact that accelerations and decelerations are controlled.

Figure 3:
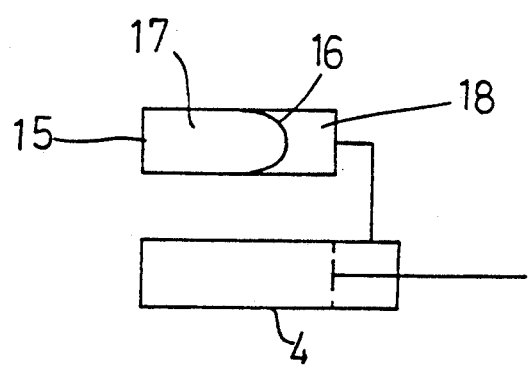
FIG. 3 illustrates an advantageous embodiment with nitrogen accumulator.

To dampen the movements, a hydraulic jack (4) is advantageously provided for controlling the rotating arm or arms (1) with a nitrogen accumulator (15) mounted on said jack (4), this device being illustrated in FIG. 3.

The device works as follows. The jack (4) comprises a perforated piston allowing the oil to flow from one compartment into the other according to the movement of the piston rod.

This jack is also connected to the nitrogen accumulator (15) constituted by a container equipped with a movable wall (16) separating it into two chambers, one (17) is closed and contains the nitrogen, and the other (18) is connected with the jack (4).

The retraction of the rod of jack (4) in order to bring the sheet from the gripping station to the depositing station drives the oil towards the compartment (18) of the accumulator.

The release of said rod, on the contrary, allows the return of that oil, thus restoring the energy for raising the rotating arm from the depositing station back to the gripping station.

Hydraulic jacks (6) and (13) could also be used with nitrogen accumulators mounted on them.

The principal advantage of such a device is its polyvalency: lifting of sheets of different dimensions for competitive rates, e.g. up to 2 secs. for small sheets, and more than 4 secs. for larger sheets, coupled with a simplicity of design and implementation.

Preferably, this machine is used for sheets reaching up to 2 m × 1.5 m.

I claim:

1. Device for lifting sheets of glass brought on a conveyor, comprising at least one arm (1) rotatable about a horizontal spindle (2), situated at the lower end of said arm, between a substantially vertical position for gripping the sheets on the conveyor and a substantially horizontal position for depositing said sheets, means being also provided for rotating the arm, device characterized in that it further comprises:

a support (5) mounted on the upper end of each rotating arm (1), said support (5) being slidable along the axis of said arm and said support (5) carrying suction cups (8) for gripping the sheets; said rotating arm or arms (1), support or supports (5) and suction cups (8) being disposed symmetrically with respect to the conveyor axis, their number and disposition being determined as a function of the dimensions of the sheets to be lifted, at least two retractable arms (9) which fasten with the support or supports (5) which arms are rotatable between a substantially horizontal work position and a retracted rest position about a horizontal axis (10) carried by said support or supports (5), each arm (9) being provided with suction cups (12), said arms (9) and suction cups (12) being disposed symmetrically with respect to the conveyor axis and in such a way that the sheets of large dimensions are gripped while being in equilibrium, means for synchronously actuating and controlling said retractable arms, supports and suction cups.

2. Device according to claim 1, characterized in that said means for actuating said retractable arms (9) consist in a jack (13) positioned inside the corresponding assembly constituted of the rotating arm (1) and the support (5) and carrying said retractable arms (9), said jack (13) actuating the horizontal axis (10) which transmits the movement to said retractable arms (9).

3. Device according to claim 1, characterized in that said device comprises a hydraulic jack (4) actuating a horizontal shaft (3) mounted at the lower end of said rotating arm or arms (1) and allowing the rotation of said arm or arms (1), and in that it further comprises a nitrogen accumulator (15) at the level of said jack (4) to dampen the movements of said rotating arm or arms.

4. Device according to claim 1, characterized in that hydraulic jacks (6) and (13) actuate the retractable arms (9) and the support or supports (5), each jack being connected to a nitrogen accumulator (15).

* * * * *